United States Patent Office 3,709,786
Patented Jan. 9, 1973

3,709,786
PROCESS FOR PRODUCING NICOTINAMIDE
ADENINE DINUCLEOTIDE
Kiyoshi Nakayama, Sagamihara-shi, Japan, assignor to
Kyowa Hakko Kogyo Co., Ltd., Tokyo, Japan
No Drawing. Continuation of abandoned application Ser.
No. 656,651, July 28, 1967. This application June 17,
1968, Ser. No. 737,306
Claims priority, application Japan, July 29, 1966,
41/49,396, 41/49,397
Int. Cl. C12d 13/06
U.S. Cl. 195—28 N  10 Claims

ABSTRACT OF THE DISCLOSURE

The present disclosure relates to a method for producing nicotinamide adenine dinucleotide which comprises culturing a microorganism capable of producing nicotinamide adenine dinucleotide in an aqueous nutrient medium under aerobic conditions in the presence of at least one material selected from the group consisting of adenine adenosine, adenosine monophosphate, adenosine diphosphate and adenosine triphosphate with or without a second material selected from the group consisting of nicotinic acid, nicotinamide, nicotine mononucleotide, nicotinamide mononucleotide, nicotinic acid riboside, nicotinamide riboside, and nicotinic acid adenine dinucleotide. Derivatives and various mixtures of these compounds may be employed.

CROSS-REFERENCE TO RELATED APPLICATION

This application is a continuation of copending application Ser. No. 656,651, filed on July 28, 1967 and now abandoned.

The present invention relates to a process for producing nicotinamide adenine dinucleotide in high yields. More particularly, the present invention concerns a process for producing nicotinamide adenine dinucleotide by fermentation in the presence of at least one material selected from the group consisting of adenine, adenosine, adenosine monophosphate, adenosine diphosphate and adenosine triphosphate with or without at least one second material selected from the group consisting of nicotinic acid, nicotinamide, nicotine mononucleotide, nicotinamide mononucleotide, nicotinic acid riboside, nicotinamide riboside, and nicotinic acid adenine dinucleotide, including derivatives of all of these materials.

Nicotinamide adenine dinucleotide can be found in yeasts, molds or bacteria. Accordingly, a process for producing nicotinamide adenine dinucleotide by extracting the raw material from bacterial cells and purifying the same is well known. yet, this process has its disadvantages.

Nicotinamide adenine dinucleotide is a compound having an important role in biochemical reactions and is also useful in the alcoholic fermentation of glucose. Nicotinamide adenine dinucleotide, also known as a coenzyme I, dehydrogenase I, diphosphopyridine-nucleotide or cozymase, has the following structural formula:

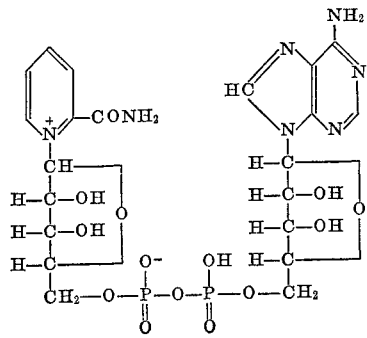

One of the objects of the present invention is to provide a process for producing nicotinamide adenine dinucleotide by a fermentation method on an industrial scale.

Another object of the present invention is to provide a process for the preparation of nicotinamide adenine dinucleotide in high yields.

Other objects and further scope of applicability of the present invention will become apparent from the detailed description given hereinafter; it should be understood however, that the detailed description and specific examples, while indicating preferred embodiments of the present invention, are given by way of illustration only, since various changes and modifications within the spirit and scope of the invention will become apparent to those skilled in the art from this detailed description.

Pursuant to the present invention, a process for producing nicotinamide adenine dinucleotide in high yields has been developed by adding to a fermentation medium containing a microorganism capable of producing nicotinamide adenine dinucleotide at least one material selected from the group consisting of adenine, adenosine, adenosine monophosphate, adenosine diphosphate and adenosine triphosphate, with or without a second material selected from the group consisting of nicotinic acid, nicotinamide, nicotine mononucleotide, nicotinamide mononucleotide, nicotinic acid riboside, nicotinamide riboside, nicotinic acid adenine dinucleotide and derivatives of these materials.

Heretofore, it has been known that nicotinamide adenine dinucleotide content may be increased by adding nicotinic acid or nicotinamide to animal tissues or blood. However, the present inventors have found that the amount of nicotinamide adenine dinucleotide produced can be increased by adding to the fermentation medium the adenine compounds listed above, including the derivatives and substituted derivatives thereof, either alone or together with the nicotinic acid compounds listed above, including the derivatives or substituted derivatives of these latter compounds.

The above-mentioned compounds may be added to the culture medium at any time during the fermentation process. In the situation where both the adenine compounds and the nicotinic acid compounds are added to the fermentation medium, they may be added together or individually and, again, at any time during fermentation. When these compounds are produced because of the specific character of the microorganisms employed, the resultant compounds effectively facilitate the production of nicotinamide adenine dinucleotide.

Generally, the amount of the adenine compounds or adenine-nicotinic acid mixtures added to the fermentation medium will vary depending upon the particular microorganisms utilized. Advantageously, the amount of these compounds added to the fermentation medium will vary from about 50 mg./l. to about 10 g./l. Of course, these compounds may be added to the culture medium in the form of derivatives of these materials, for example, in the form of appropriate salts, such as adenine hydrochloride, adenine sulfate, etc. The adenine and nicotinic acid compounds used in the process of the present invention sometimes inhibit growth of microorganisms when high concentrations of these compounds are added at the beginning of the cultivation. In this case, it is preferable to add these compounds after the microorganism actually grows.

Any of the microorganisms which are capable of producing nicotinamide adenine dinucleotide can be used in the process of the present invention. Typical microorganisms include yeasts, bacteria, ray fungi and molds. Microorganisms which are particularly effective in increasing the amount of nicotinamide adenine dinucleotide produced are yeasts belonging to a genus such as Saccharomyces, Candida, Torula, Schizosaccharomyces, Torulopsis, Hansenula, Endomyces, Rhodotorula, Zygosaccharomyces and so on, and bacteria belonging to the genera Brevibacterium, Corynebacterium, Arthrobacter, Lactobacillus and Streptococcus. The microorganisms employed in the present invention are widely distributed as shown in Table 1.

peptone, bouillon, casein hydrolysates, fish solubles, rice bran extract, etc. may be employed. These substances may also be used either singly or in combinations of two or more. It may be also necessary to add certain essential nutrients to the culture medium, depending upon the particular microorganism employed, such as amino acids,

TABLE 1

| Microorganisms | Nicontinamide adenine dinucleotide accumulated in the fermentation liquor | | | | |
| --- | --- | --- | --- | --- | --- |
| | I | II | III | IV | V |
| Aerobacter aerogenes ATCC 8308 | ± | + | + | ++ | + |
| Aerobacter aerogenes ATCC 15247 | ± | + | + | + | + |
| Agrobacterium tumefaciens ATCC 4720 | ± | + | ++ | ++ | ++ |
| Agrobacterium tumefaciens ATCC 4452 | ± | + | + | + | + |
| Arthrobacter ureafaciens ATCC 7562 | + | ++ | ++ | +++ | ++ |
| Arthrobacter citreus ATCC 11624 | ± | + | ++ | ++ | +++ |
| Arthrobacter globiformis ATCC 8010 | ± | + | ++ | ++ | ++ |
| Arthrobacter tumescens ATCC 6947 | + | + | ++ | ++ | ++ |
| Azotobacter indicus ATCC 9037 | + | + | ++ | ++ | ++ |
| Bacillus cereus ATCC 7004 | + | ++ | ++ | ++ | ++ |
| Brevibacterium acetylicum ATCC 954 | + | ++ | ++ | ++ | ++ |
| Brevibacterium ammoniagenes ATCC 6871 | + | ++ | ++ | +++ | +++ |
| Brevibacterium ammoniagenes ATCC 6872 | + | ++ | ++ | +++ | +++ |
| Brevibacterium helvolum ATCC 11822 | + | ++ | ++ | ++ | ++ |
| Brevibacterium imperiale ATCC 8365 | ± | + | ++ | + | ++ |
| Brevibacterium linens ATCC 9175 | + | ++ | ++ | ++ | ++ |
| Brevibacterium vitarumen ATCC 10234 | + | + | ++ | ++ | +++ |
| Corynebacterium michiganese ATCC 10202 | ± | + | + | ++ | ++ |
| Corynebacterium rathayi ATCC 13659 | + | ++ | ++ | +++ | ++ |
| Corynebacterium tritici ATCC 11402 | + | ++ | + | ++ | ++ |
| Flavobacterium arborescens ATCC 4358 | + | + | + | + | + |
| Staphylococcus epidermidis ATCC 155 | + | ++ | ++ | ++ | ++ |
| Micrococcus lysodeikticus ATCC 4698 | + | + | + | + | + |
| Micrococcus sodensis ATCC 15932 | ± | + | + | ++ | ++ |
| Micrococcus varians ATCC 399 | + | ++ | ++ | +++ | ++ |
| Pseudomonas aeruginosa ATCC 15246 | ± | + | + | + | + |
| Pseudomonas putida ATCC 4359 | ± | + | + | + | + |
| Pseudomonas boreopolis ATCC 15452 | + | + | + | ++ | ++ |
| Proteus vulgaris ATCC 19181 | ± | ++ | ++ | ++ | ++ |
| Serratia marcescens ATCC 19180 | ± | + | + | +++ | ++ |
| Sarcina lutea ATCC 15176 | + | + | + | ++ | ++ |
| Streptococcus faecalis ATCC 11420 | + | + | ++ | + | + |
| Xanthomonas citri ATCC 15923 | ± | + | + | ++ | ++ |
| Candida utilis ATCC 16321 | ± | ++ | ++ | ++ | ++ |
| Candida utilis ATCC 9950 | ± | ++ | ++ | +++ | ++ |
| Saccharomyces cerevisiae ATCC 15248 | + | ++ | ++ | ++ | ++ |
| Saccharomyces cerevisiae ATCC 7754 | ± | + | + | ++ | ++ |
| Saccharomyces carlsbergensis ATCC 9080 | + | ++ | ++ | ++ | ++ |
| Torula utilis ATCC 15239 | + | ++ | ++ | ++ | +++ |
| Zygosaccharomyces major ATCC 15249 | ± | + | + | ++ | ++ |
| Candida tropicalis ATCC 15114 | ± | + | + | ++ | ++ |
| Aspergillus niger NRRL (ATCC 10254) | ± | + | + | ++ | ++ |
| Ustilago sphaerogena ATCC 12421 | ± | + | + | + | + |
| Penicillium chrysogenum ATCC 15421 | ± | ++ | + | ++ | ++ |
| Streptomyces albus ATCC 618 | ± | + | + | ++ | ++ |
| Streptomyces aureus ATCC 3309 | ± | + | + | ++ | ++ |
| Streptomyces antibioticus ATCC 10382 | ± | + | ++ | ++ | ++ |
| Streptomyces flavovirens ATCC 3320 | ± | + | + | ++ | ++ |
| Streptomyces vinaceus NRRL-B 1381 | ± | + | ++ | + | + |

NOTE.—I=No addition of adenine; II=100 μg./ml. of adenine added; III=300 μg./ml. of adenosine triphosphate added; IV=50 μg./ml. of adenine and 100 μg./ml. of nicotinamide added; V=150 μg./ml. of adenosine triphosphate and 100 μg./ml. of nicotinamide added.

The fermentation medium comprises either a synthetic culture medium or a natural nutrient medium which contains the essential nutrients for the growth of the microorganism strain employed. Such fermentation medium generally contains a carbon source, such a carbohydrates, a nitrogen source, inorganic compounds and the like which are utilized by the microorganism employed in specific amounts.

The carbohydrates include, for example, glucose, fructose, maltose, sucrose, starch, starch hydrolysate, molasses and the like. Small amounts of other suitable carbon sources, such as glycerol, mannitol, sorbitol, organic acids, hydrocarbons, etc., may be used in the fermentation medium along with the carbohydrates. The carbohydrates may be used either singly or in mixtures of two or more and any small amount of other carbon sources may also be present either singly or in mixtures of two or more.

The inorganic compounds include such materials as potassium phosphate, magnesium sulfate, iron sulfate or other iron salts, potassium chloride, magnesium chloride, calcium chloride, etc. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, fish meal, for example, aspartic acid, threonine, methionine, etc., and/or vitamins, for example, biotin, thiamine, cobalamin and the like.

Fermentation is conducted under aerobic conditions, such as aerobic shaking of the culture or with stirring of a submerged culture, an incubation temperature of about 20° to 40° C. and a pH of about 5 to 9 being preferable. Remarkably large amounts of nicotinamide adenine dinucleotide are found to be accumulated in the fermentation liquor and microbial cells.

Other conditions of temperature and pH may also be used with lower yields.

After the completion of the fermentation, the nicotinamide adenine dinucleotide may be separated from the culture liquor by conventional means, such as ion exchange resin treatment, precipitation with metallic salts, extraction methods, conventional adsorption methods, chromatography and the like.

The following examples are given merely as illustrative of the present invention and are not to be considered as limiting. Unless otherwise noted, the percentages in the application and in the examples are by weight.

EXAMPLE 1

Corynebacterium sp. No. 3485, ATCC 21084, is used as the seed bacterium. It is cultured at 30° C. for 24 hours in a seed medium consisting of 2% glucose, 1% peptone, 1% yeast extract, 0.3% sodium chloride and 30 micrograms per liter of biotin.

The fermentation medium employed has the following composition:

50 g. glucose
6 g. urea
2 g. $K_2HPO_4$
2 g. $KH_2PO_4$
0.5 g. $MgSO_4 \cdot 7H_2O$
10 g. yeast extract
30 micrograms of biotin per liter of the culture medium One milliliter of a 12% solution of urea is separately sterilized and added to 19 ml. of the fermentation medium which has been previously sterilized in an autoclave under the conditions of 1 kg./cm.[2] for 10 minutes.

The seed culture is inoculated into the fermentation medium in an amount of 10% by volume thereof. The mixture of media is then poured in 20 ml. portions into individual 250 ml. conical flasks. After sterilization under pressure, fermentation is carried out with aerobic shaking of the culture at 30° C. After 24 hours of culturing, adenine is added to the fermentation liquor to give a concentration of 2 mg./ml. and then the cultivation is continued for 72 hours. 210 micrograms per milliliter of nicotinamide adenine dinucleotide is accumulated in the fermentation liquor. The nicotinamide adenine dinucleotide is recovered by an ion exchange resin treatment.

The same culture as mentioned above is carried out but without adding adenine after 24 hours of culturing. In this case, the amount of nicotinamide adenine dinucleotide accumulated in the fermentation liquor is 37 micrograms per milliliter.

EXAMPLE 2

Culturing is carried out in the same manner and under the same conditions as described in Example 1, except that adenosine is added, instead of adenine, to give a concentration of 2 mg./ml. in the culture medium. The amount of nicotinamide adenine dinucleotide produced is 183 micrograms per milliliter.

EXAMPLE 3

Culturing is conducted in the same manner and under the same conditions as described in Example 1, except that 5'-adenylic acid (adenosine monophosphate) is used instead of adenine. The amount of nicotinamide adenine dinucleotide produced is 173 micrograms per milliliter.

EXAMPLE 4

This example follows the same procedure as Example 1, except that adenosine diphosphate is used instead of adenine. The amount of nicotinamide adenine dinucleotide produced is 172 micrograms per milliliter.

EXAMPLE 5

This example follows the same procedure as Example 1, except that adenosine triphosphate is used instead of adenine. The amount of nicotinamide adenine dinucleotide produced is 187 micrograms per milliliter.

EXAMPLE 6

Each yeast culture listed in Table 2, precultured overnight in Koji liquor of Baumé 10° at 30° C., is inoculated into 50 ml. of Koji liquor of Baumé 10° in a 250 ml. conical flask in an amount of 1%, and a static culture is conducted for 2 days. The amount of yeast cells produced and the nicotinamide adenine dinucleotide content in the yeast cells are compared in Table 2 below for the cases when 50 micrograms per milliliter of adenine is added and when adenine is not added to the culture medium at the time of inoculation.

| Yeasts | Amount of yeast cells [1] | Nicotinamide adenine dinucleotide [2] |
|---|---|---|
| Candida utilis, ATCC 16321: | | |
| I | 0.9 | 3.2 |
| II | 1.1 | 5.2 |
| Saccharomyces cerevisiae, ATCC 15248: | | |
| I | 3.3 | 1.5 |
| II | 3.3 | 3.0 |
| Saccharomyces carlsbergensis, ATCC 9080: | | |
| I | 2.4 | 2.1 |
| II | 2.5 | 3.4 |
| Torula utilis, ATCC 15239: | | |
| I | 2.3 | 1.2 |
| II | 2.1 | 3.2 |
| Zygosaccharomyces major, ATCC 15249: | | |
| I | 1.0 | 0.4 |
| II | 1.0 | 2.0 |
| Candida tropicalis, ATCC 15114: | | |
| I | 0.8 | 1.2 |
| II | 0.7 | 3.0 |

[1] Dry weight, g./l.
[2] Mg./dried yeast cells, 1 g.
NOTE.—I=Adenine not added; II=Adenine added.

EXAMPLE 7

This example follows the same procedure as that of Example 1, except that Arthobacter sp. No. 3486, ATCC 21085, is used instead of Corynebacterium sp. No. 3485, ATCC 21084 as the microorganism. Also, adenosine triphosphate is employed instead of adenine. The amount of nicotinamide adenine dinucleotide produced is 270 micrograms per milliliter.

In the case where no adenosine triphosphate is added to the medium, as a control, the amount of nicotinamide adenine dinucleotide accumulated is 34 micrograms per milliliter.

EXAMPLE 8

Corynebacterium sp. No. 3485, ATCC 21084, is used as the seed bacterium. It is cultured at 30° C. for 24 hours in a seed medium consisting of 2% glucose, 1% peptone, 1% yeast extract, 0.3% sodium chloride and 30 micrograms per liter of biotin.

The fermentation medium employed has the following composition:

50 g. glucose
6 g. urea
2 g. $K_2HPO_4$
2 g. $KH_2PO_4$
0.5 g. $MgSO_4 \cdot 7H_2O$
10 g. yeast extract
30 micrograms of biotin per liter of the medium One ml. of a 12% solution of urea is separately sterilized and added to 19 ml. of the fermentation medium which has been previously sterilized in an autoclave under the conditions of 1 kg./cm.[2] for 10 minutes. The seed culture is inoculated into the fermentation medium in an amount of 10% by volume thereof. The mixture of media is then poured in 20 ml. portions into individual 250 ml. conical flasks. After sterilization under pressure, fermentation is carried out with aerobic shaking of the culture at 30° C. After 72 hours of culturing, the compounds shown in Table 3 are added to the fermentation medium to give a concentration of 2 mg./ml. After an additional 48 hours of culturing, nicotinamide adenine dinucleotide is accumulated in the fermentation liquor and recovered by an ion exchange resin treatment. The amounts of the product recovered are shown in Table 3.

TABLE 3

| Compounds added: | Nicotinamide adenine dinucleotide, µg./ml. |
|---|---|
| Nicotinic acid+adenine | 510 |
| Nicotinic acid+adenosine | 520 |
| Nicotinic acid+adenosine monophosphate | 430 |
| Nicotinic acid+adenosine diphosphate | 320 |
| Nicotinic acid+adenosine triphosphate | 330 |
| Nicotinamide+adenine | 610 |
| Nicotinamide+adenosine | 570 |
| Nicotinamide+adenosine monophosphate | 430 |

TABLE 3—Continued

| Compounds added: | Nicotinamide adenine dinucleotide, μg./ml. |
|---|---|
| Nicotinamide+adenosine diphosphate | 350 |
| Nicotinamide+adenosine triphosphate | 420 |
| Nicotinic acid mononucleotide+adenine | 410 |
| Nicotinic acid mononucleotide+adenosine | 420 |
| Nicotinic acid mononucleotide+adenosine monophosphate | 330 |
| Nicotinic acid mononucleotide+adenosine diphosphate | 370 |
| Nicotinic acid mononucleotide+adenosine triphosphate | 350 |
| Nicotinamide mononucleotide+adenine | 290 |
| Nicotinamide mononucleotide+adenosine | 280 |
| Nicotinamide mononucleotide+adenosine monophosphate | 250 |
| Nicotinamide mononucleotide+adenosine diphosphate | 250 |
| Nicotinamide mononucleotide+adenosine triphosphate | 250 |
| Nicotinic acid riboside+adenine | 480 |
| Nicotinic acid riboside+adenosine | 480 |
| Nicotinic acid riboside+adenosine monophosphate | 320 |
| Nicotinic acid riboside+adenosine diphosphate | 345 |
| Nicotinic acid riboside+adenosine triphosphate | 345 |
| Nicotinamide riboside+adenine | 300 |
| Nicotinamide riboside+adenosine | 345 |
| Nicotinamide riboside+adenosine monophosphate | 370 |
| Nicotinamide riboside+adenosine diphosphate | 370 |
| Nicotinamide riboside+adenosine triphosphate | 390 |
| Nicotinic acid adenine dinucleotide+adenine | 320 |
| Nicotinic acid adenine dinucleotide+adenosine | 320 |
| Nicotinic acid adenine dinucleotide+adenosine monophosphate | 270 |
| Nicotinic acid adenine dinucleotide+adenosine diphosphate | 240 |
| Nicotinic acid adenine dinucleotide+adenosine triphosphate | 270 |
| No addition | 37 |

EXAMPLE 9

This example follows the same procedure as Example 8, except that Arthrobacter sp. No. 3486, ATCC 21085, is employed as the microorganism. The amounts of nicotinamide adenine dinucleotide accumulated in the fermentation medium are shown in Table 4.

TABLE 4

| Compounds added: | Nicotinamide adenine dinucleotide, μg./ml. |
|---|---|
| Nicotinic acid+adenine | 530 |
| Nicotinamide+adenine | 480 |
| Nicotinic acid+adenosine triphosphate | 470 |
| Nicotinamide+adenosine triphosphate | 550 |
| No addition | 34 |

EXAMPLE 10

Each yeast culture listed in Table 5, precultured overnight in a Koji liquor of Baume 10° at 30° C., is inoculated into 50 ml. of Koji liquor of Baume 10° in a 250 ml. flask in an amount of 1%, and a static culture is conducted. The amount of yeast cells produced and the nicotinamide adenine dinucleotide content in the yeast cells are compared in Table 5 below in the case when 100 micrograms per milliliter of nicotinamide and adenine is added to the fermentation medium and in the case when these compounds are not added to the medium 24 hours after inoculation.

| Yeasts | Amount of yeast cells [1] | Nicotinamide adenine dinucleotide [2] |
|---|---|---|
| Candida utilis, ATCC 16321: | | |
| I | 0.9 | 3.2 |
| II | 1.0 | 6.4 |
| Sacchromyces cerevisiae, ATCC 15248: | | |
| I | 3.3 | 1.5 |
| II | 3.5 | 3.5 |
| Sacchromyces carlsbergensis, ATCC 9080: | | |
| I | 2.4 | 2.1 |
| II | 2.7 | 4.0 |
| Torula utilis, ATCC 15239: | | |
| I | 2.3 | 1.2 |
| II | 2.0 | 8.1 |
| Zygosaccharomyces major, ATCC 15249: | | |
| I | 1.0 | 0.4 |
| II | 1.2 | 5.1 |
| Candida tropicalis, ATCC 15114: | | |
| I | 0.8 | 1.2 |
| II | 0.7 | 5.2 |

[1] Dry weight, g./l.
[2] Mg./g., yeast cells.
NOTE.—I=Adenine and nicotinamide not added; II=Adenine and nicotinamide added.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A process for producing nicotinamide adenine dinucleotide which comprises culturing a nicotinamide adenine dinucleotide-producing microorganism belonging to a genus selected from the group consisting of Aerobacter, Agrobacterium, Athrobacter, Azotobacter, Bacillus, Corynebacterium, Flavobacterium, Staphylococcus, Micrococcus, Pseudomonas, Proteus, Serratia, Sarcina, Streptococcus, Xanthomonas, Candida, Saccharomyces, Torula, Zygosaccharomyces, Aspergillus, Ustilago, Penicillium and Streptomyces or belonging to a genus-species selected from the group consisting of *Brevibacterium acetylicum*, *Brevibacterium helvolum*, *Brevibacterium imperiale*, *Brevibacterium linens* and *Brevibacterium vitariumen* in an aqueous nutrient medium under aerobic conditions in the presence of an adenine compound selected from the group consisting of adenine, adenosine, adenosine monophosphate, adenosine diphosphate, adeosine triphosphate and mixtures thereof, accumulating the nicotinamide adenine dinucleotide in the resultant culture liquor and in the microbial cells and isolating the nicotinamide adenine dinucleotide therefrom.

2. The process of claim 1, wherein a nicotinic acid compound selected from the group consisting of nicotinic acid, nicotinamide, nicotine mononucleotide, nicotinamide mononucleotide, nicotinic acid riboside, nicotinamide riboside, nicotinic acid adenine dinucleotide, and mixtures thereof is also added to said medium.

3. The process of claim 1, wherein from about 50 mg./l. to about 10 g./l. of said adenine compound is present in the medium.

4. The process of claim 2, wherein from about 50 mg./l. to about 10 g./l .of the mixture of said adenine compound and said nicotinic acid compound is present in the medium.

5. The process of claim 3, wherein culturing is carried out at a temperature of from about 20° to 40° C. and at a pH of from about 5 to 9.

6. The process of claim 4, wherein culturing is carried out at a temperature of from about 20° to 40° C. and at a pH of from about 5 to 9.

7. The process of claim 1, wherein said microorganism is a yeast belonging to a genus selected from the group consisting of Saccharomyces, Candida, Torula, Schizosaccharomyces, Torulopsis, Hansenula, Endomyces, Rhodotorula and Zygosaccharomyces.

8. The process of claim 2, wherein said microorganism is a yeast belonging to a genus selected from the group consisting of Saccharomyces, Candida, Torula, Schizosaccharomyces, Torulopsis, Hansenula, Endomyces, Rhodotorula and Zygosaccharomyces.

9. A process for producing nicotinamide adenine dinucleotide which comprises culturing a nicotinamide adenine dinucleotide-producing microorganism belonging to a genus selected from the group consisting of Aerobacter, Agrobacterium, Arthrobacter, Azotobacter, Bacillus, Corynebacterium, Flavobacterium, Staphylococcus, Micrococcus, Pseudomonas, Proteus, Serratia, Sarcina, Streptococcus, Xanthomonas, Candida, Saccharomyces, Torula, Zygosaccharomyces, Aspergillus, Ustilago, Penicillum and Streptomyces or belonging to a genus-species selected from the group consisting of *Brevbacterium acetylicum*, *Brevibacterium helvolum*, *Brevibacterium imperiale*, *Brevibacterium linens* and *Brevibacterium vitarumen* in an aqueous nutrient medium under aerobic conditions at a temperature of from about 20° to 40° C. and at a pH of from about 5 to 9 in the presence of an adenine compound selected from the group consisting of adenine, adenosine, adenosine monophosphate, adenosine diphosphate, adenosine triphosphate and mixtures thereof, accumulating the nicotinamide adenine dinucleotide in the resultant culture liquor and in the microbial cells, and isolating the nicotinamide adenine dinucleotide therefrom.

10. The process of claim 9, wherein a nicotinic acid compound selected from the group consisting of nicotinic acid, nicotinamide, nicotine mononucleotide, nicotinamide mononucleotide, nicotinic acid riboside, nicotinamide riboside, nicotinic acid adenine dinucleotide and mixtures thereof is also added to said medium.

References Cited

UNITED STATES PATENTS 3,368,947    2/1968    Nakayama et al. ____ 195—28 N

ALVIN E. TANENHOLTZ, Primary Examiner

U.S. Cl. X.R.

195—114